June 11, 1963   L. J. DAWES   3,093,155

VARIABLE-RESTRICTION VALVE

Filed June 20, 1960   2 Sheets-Sheet 1

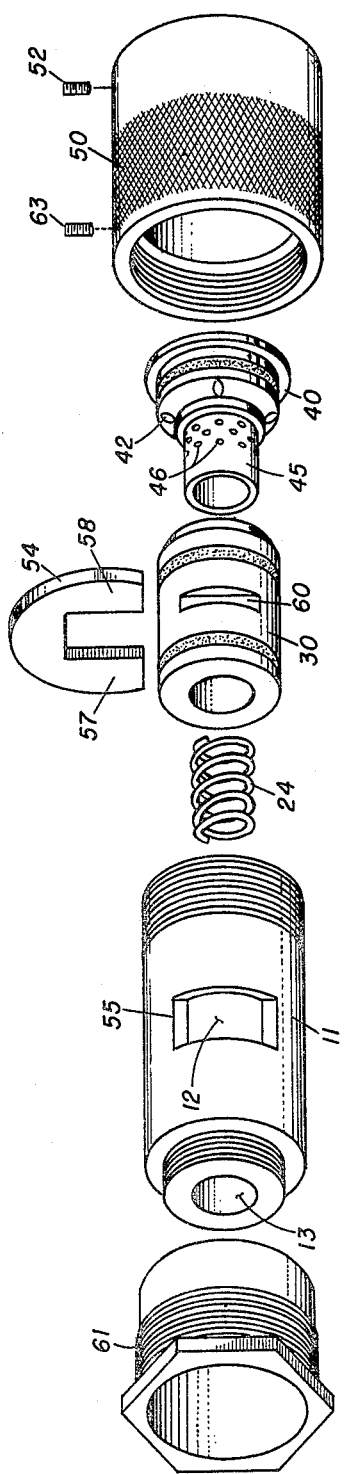
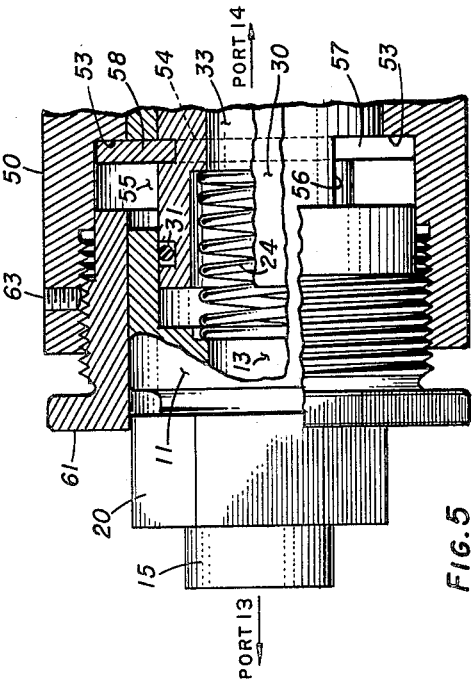
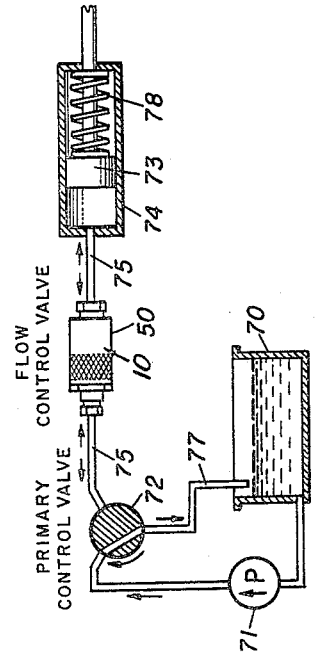

United States Patent Office 3,093,155
Patented June 11, 1963

3,093,155
VARIABLE-RESTRICTION VALVE
Leslie J. Dawes, Van Nuys, Calif., assignor to The Bendix Corporation, North Hollywood, Calif., a corporation of Delaware
Filed June 20, 1960, Ser. No. 37,217
1 Claim. (Cl. 137—269)

This invention relates to hydraulic valves and more particularly to manually adjustable, variable-restriction valves.

In the control and utilization of hydraulic fluids, a need often exists for a restriction valve allowing free fluid flow in one direction and restricted flow in the opposite direction. An example of applications for such a valve is the hydraulic circuit of a reversible hydraulic motor. There it is often desirable to limit the rate of fluid flow in one direction to obtain slow movement of the motor in one direction while allowing free flow of fluid in the other direction to provide rapid return movement of the motor.

In a similar hydraulic motor application, it is often desired to have controlled flow in the operating direction into a hydraulic cylinder and checked or obstructed flow in the opposite direction to hold the piston in the operated direction until the pressure is relieved; for example, over a branch line.

Heretofore the combination of free flow in one direction and restricted flow in the other direction through a hydraulic system has usually been accomplished by the combination of a check valve with a manually adjustable valve in parallel thereto. Often the two parallel valves are built in one assembly but, nevertheless, constitute two independent valves with the disadvantage of cost because of the need for two valve seats and two associated poppets or closures.

A general object of this invention is to provide a single hydraulic valve offering selectively:

(1) controlled equal flow rates in both directions;
(2) controlled flow in one direction and free flow in the opposite direction;
(3) ordinary check operation of free flow in one direction and checked flow in the opposite direction;
(4) controlled flow in one direction and flow-check operation in the opposite direction; and
(5) controlled flow of different rates in both directions.

Another object of this invention is to realize such a valve having simple manual flow control adjustment.

Another object is to provide a valve with the above characteristics which: is small in size, actually in the same order of diameter of the hydraulic line in which it is installed; is highly reliable in operation; and produces little noise in response to the passage of fluid therethrough.

One embodiment of the invention comprises a valve body having a longitudinal bore extending therethrough from one port at one end to a second port at the opposite end. A central flow-diverting member is secured within the bore in the region of one port so as to restrict fluid flow between that port and the bore to the peripheral region of the bore. A sleeve is mounted within the valve body for movement along the bore restricting fluid flow between the peripheral region of the bore and the central portion of the bore communicating with the second port. The central flow-diverting member includes a tubular extension telescoping within the sleeve and including several wall apertures. A yoke-shaped member is positioned in a slot in the wall of the valve body and engages the internal sleeve. A second sleeve threaded on the outer surface of the valve body also engages the yoke so that adjustment of the outer sleeve moves the inner sleeve to vary the area of the fluid passage within the valve. This arrangement allows the control of fluid flow through the valve in both directions.

The coupling between the outer sleeve and the inner sleeve is variable, and a means is provided to furnish a mechanical bias to the inner sleeve whenever it is not rigidly coupled to the outer sleeve.

One feature of the invention resides in the combination of an inner sleeve positioned in a valve body for flow-controlling movement in cooperation with a central obstruction, with the position of the inner sleeve controlled by an outer sleeve threaded to the valve body and coupled to the inner sleeve.

Another feature is an arrangement for selectively coupling the outer sleeve to the inner sleeve to allow either full control of the inner sleeve position or free movement of the inner sleeve in one direction under the influence of pressure differentials between the two ports of the valve.

Still another feature is the combination of a telescoping inner sleeve and an apertured tubular extension of the flow-diverting member constituting the flow-control elements of a hydraulic valve and serving to reduce the noise resulting from fluid flow through the valve.

These and other features of the invention may be understood from the following detailed description with reference to the accompanying drawing, in which:

FIG. 3 is a flow diagram of a hydraulic system employing the valve of this invention;

FIG. 4 is an exploded view of portions of the valve of FIGS. 1 and 2; and

FIG. 5 is a fragmentary section of the valve of FIGS. 1 and 2 illustrating a secondary flow adjustment.

Figure 1:
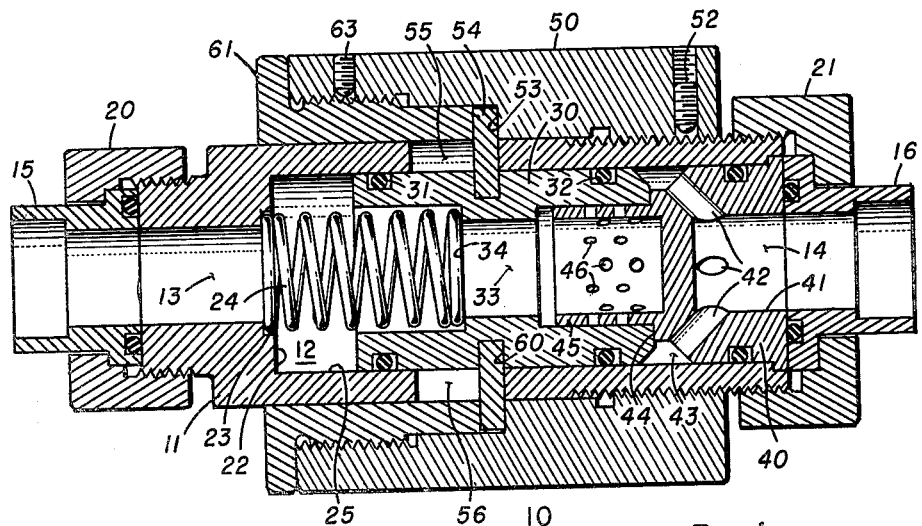
FIG. 1 is a longitudinal section along the central axis of a valve in accordance with this invention.

Referring to FIG. 1, a valve assembly 10 includes a cylindrical valve body 11 having an axial bore 12 extending from a port 13 at one end to a port 14 at the opposite end. Identical unions 15 and 16 are secured, as by nuts 20 and 21, to the opposite ends of the valve body 11 in communication with the ports 13 and 14. The valve 10 is normally connected into a hydraulic system at the unions 15 and 16. The axial bore 12 extending through the major length of valve body 11 is joined to the port 13 at an end surface 22 including a step 23 which acts as the seat for a spring 24. The remainder of the bore 12 is defined by the cylindrical surface 25 extending through the valve body 11.

Positioned within the bore 12 is an inner sleeve 30 sealed with respect to the surface 25 by means of a pair of O-rings 31 and 32 resting in annular grooves in the outer surface of sleeve 30. The sleeve 30 has a central opening 33 extending therethrough and a step 34 against which the opposite end of spring 24 rests. The spring 24 urges the inner sleeve 30 in the direction toward port 14. The stop for the sleeve 30 is a flow-diverting member 40 including a recess 41 communicating with the port 14 and a plurality of passages 42, for example, four, extending between the recess 41 and the peripheral region 43 of the axial bore 12. Communication between the peripheral region 43 and the remainder of the axial bore 12 is restricted by the inner sleeve 30 bearing against an annular seat 44 of the centtral member 40. The member 40 includes a tubular extension 45 telescoping within the central opening 33 of inner sleeve 30. The tubular portion 45 has a plurality of staggered apertures 46 through which fluid may pass from the peripheral region 43 to the central opening 33 whenever the sleeve 30 is displaced away from the seat 44, i.e., to the left in the

Figure 2:
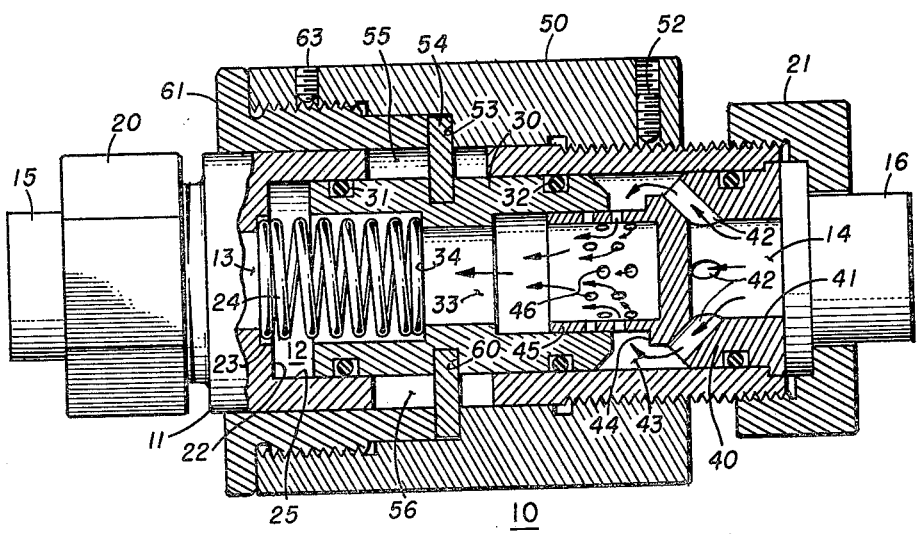
FIG. 2 is a longitudinal section of the valve of FIG. 1 shown in the open condition.

3 drawing as shown in FIG. 2. The apertures 46 provide a variable-area fluid passage through the valve, dependent upon the longitudinal position of the inner sleeve 30. The use of the multiplicity of openings 42 has the further advantage of reducing the level of noise produced by the passage of fluid through the valve.

Under the condition shown in FIGS. 1 and 2, position of inner sleeve 30 is not determined by the spring 24, but by the position along the body 11 of an outer sleeve 50 having internal threads engaging threads on the outer surface of the body 11. The outer sleeve 50 includes a set screw 52 for locking its position when a desired adjustment is achieved. The sleeve 50 includes an internal annular step 53 which bears against a yoke member 54, best seen in FIG. 4. The yoke member has a pair of arm portions 57, 58 extending through respective slots 55 and 56 in the body 11 and resting in grooves 60 in the wall of the inner sleeve 30. The yoke 54 is maintained in rigid contact with the shoulder 53 in the outer sleeve 50 by a bushing 61 threaded within the sleeve 50 and bearing against the yoke 54. A set screw 63 holds the bushing 61 in a fixed position relative to sleeve 50.

(1) *Controlled Flow in Both Directions*

The first mode of operation of the valve, for controlled flow at equal rates in both directions, is illustrated in FIG. 2, showing the valve with the outer sleeve 50, the yoke 54 and the inner sleeve 30 withdrawn from the closed position of FIG. 1 by rotation of the outer sleeve 50 on its threads in a clockwise direction when viewed from the port 14. One direction of flow is indicated by the small arrows as being through the union 16, port 14, the passages 42 to the peripheral region 43, thence through the apertures 46 in the tubular extension 45 to the central opening 33 in inner sleeve 30, through the bore 12 to the port 13.

With the adjustment shown in FIG. 2, fluid will also flow at the same rate from port 13 to port 14. The flow in either case is in a continuous relatively straight line except for the diversion outward through the passages 42 and return to the central portion of bore 12 through the apertures 46.

It is believed that the reduction in noise obtained by this valve is largely due to the breaking up of the flow into a large number of small streams by the apertures 46.

A typical aplication of the valve of FIGS. 1 and 2 is shown in FIG. 3, including a reservoir 70 (source of hydraulic fluid) connected to a pump 71 supplying the hydraulic fluid to a primary control valve 72. The valve 72 is manually or otherwise fully opened whenever the application of hydraulic fluid to a motor cylinder 74 is required. Interposed in the line 75 between the primary control valve 72 and the hydraulic cylinder 74 is the flow-control valve 10 of this invention.

The primary control valve 72 is a typical 3-way valve normally positioned as shown in FIG. 3, allowing the fluid supplied by pump 71 to flow freely back to the reservoir 70 while no fluid pressure is applied to line 75.

Upon rotation of the valve 72, from the position shown, 120° in the direction of the arrow, pump 71 is connected to deliver fluid to the line 75, and thence through flow-control valve 10 to cylinder 74 to drive the piston 73 to the right in the drawing.

Upon further actuation of the valve 72 through an additional 120° of rotation, the line 75 is connected to the return flow line 77, and the return force of spring 78 within the cylinder 74 causes the fluid within the cylinder 74 to flow back through valve 10 lines 75 and 77, to the reservoir 70.

The rate of movement of the piston 73 in both directions is controlled by the valve 10, and is dependent upon the adjustment of the valve. The valve, when adjusted as shown in FIG. 2 offers equal flow resistance in both the operating and return directions of flow. This is because the position of the sleeve 30 is determined solely by the position of the outer sleeve 50, and the spring 24 within the bore 12 has no effect.

(2) *Controlled Flow in One Direction Free Flow in the Other Direction*

When it is desired to have limited flow in one direction and free flow in the opposite direction, it may be had by simply loosening set screw 63, backing off bushing 61, and retightening set screw 63, which is readily done in the field.

With the adjustment of bushing 61 to the left relative to sleeve 50, the coupling between the outer sleeve 50 and the yoke 54 is no longer rigid. Yoke 54 may then move toward port 13 under the influence of a fluid pressure differential between ports 14 and 13 sufficient to overcome the resistance of spring 24. The spring 24 may be so light that a very small pressure differential is sufficient to move the sleeve 30 and consequently the valve effectively allows free flow from port 14 to port 13.

The rate of flow of fluid from port 13 to port 14 is, under all conditions, determined by the position of outer sleeve 50 along the body. As may be seen in FIG. 5, the sleeve 30 is restrained from movement toward port 14 by yoke 54 bearing against the surface 53 of outer sleeve 50. Therefore, flow resistance from port 13 to port 14 is controlled by the position of sleeve 50, while flow from port 14 to port 13 remains free.

(3) *Free Flow in One Direction Check Flow Operation in the Other Direction*

The valve likewise is capable of preventing flow from port 13 to port 14 merely by the adjustment of sleeve 50 toward port 14 until sleeve 30 normally rests on seat 53. With the bushing 61 fully backed off from the sleeve 50 in the same manner as described above for free flow-controlled flow operation, flow will be virtually unrestricted from port 14 to port 13. Adjusted in this manner, the valve operates as a simple check valve.

(4) *Controlled Flow in One Direction Check Flow Operation in the Other Direction*

When the bushing 61 has been only partially backed off from sleeve 50, the flow from port 14 to port 13 is partially restricted.

The position of bushing 61, of course, is continuously adjustable so that the flow resistance from port 14 to port 13 is continuously variable.

(5) *Controlled Flow in Both Directions at Different Rates*

As indicated above, the position of sleeve 50 determines the resistance to flow from port 13 to port 14. Also, the position of bushing 61 partially determines the flow resistance in the opposite direction. When bushing 61 is drawn up to clamp yoke 54 against sleeve 50, the flow resistance in both directions is the same (mode 1). However, when bushing 61 is partially withdrawn, as in mode 4 operation, the resistance to flow from port 14 to port 13 will be less than that in the opposite direction, varying with the extent that bushing 61 is withdrawn from sleeve 50.

It is to be noted that the invention provides a variable-restriction valve capable of direct in-line installation and having an over-all diameter of the same general size as the usual couplings in a line. The valve, by its nearly straight fluid-flow pattern interrupted only by the flow-diverting means and the noise-limiting tubular extension of flow-diverting member 40, introduces a minimum of turbulence into the flow and, consequently, reduced noise in operation. Additionally, the valve allows the ready adjustment of the rate of flow in both directions merely by moving the outer shell longitudinally on its threaded connection to the valve body. By simple adjustments, the valve is capable of five different modes of operation and allows the shifting from one mode to another without removing the valve from the line or without removal of pressure from the line. These features are all obtained with a structure of relative simplicity and low cost because of the small number and simple design of the component parts.

Although for the purpose of explaining the invention a particular embodiment thereof has been shown and described, obvious modifications will occur to a person skilled in the art, and I do not desire to be limited to the exact details shown and described.

I claim:

A valve comprising:

a body defining a through passage including a stationary valve element;

a movable valve element reciprocable within said passage relative to said stationary valve element for variably blocking fluid flow through said passage;

actuating means longitudinally fixed relative to said movable valve element for movement therewith;

a first control member engageable with said actuating means to limit closing movement of said movable valve element toward said stationary valve element;

a second control member engageable with said actuating means to limit opening movement of said movable valve element away from said stationary valve element;

and adjusting means for independently adjusting the longitudinal positions of said first and second control members to independently adjust the closing and opening limit positions of said movable valve element, which adjusting means comprises one means for adjustably positioning one of said control members relative to said body and another means for adjustably positioning the other control member with respect to said one control member, and in which said one control member is a sleeve threaded on said body, and said other control member is a sleeve threaded on said one control member.

References Cited in the file of this patent

UNITED STATES PATENTS

| 41,471 | Bailey | Feb. 9, 1864 |
| 2,195,069 | Arbogast | Mar. 26, 1940 |
| 2,612,337 | Maynard | Sept. 30, 1952 |
| 2,932,316 | Stanton | Apr. 12, 1960 |

FOREIGN PATENTS

| 15,904 | Great Britain | Aug. 15, 1929 |
| 118,640 | Great Britain | June 20, 1944 |